United States Patent
Yasui (10) Patent No.: US 7,253,973 B2
(45) Date of Patent: Aug. 7, 2007

(54) IMAGE-PICKUP OPTICAL SYSTEM

(75) Inventor: Hiroto Yasui, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/552,282

(22) Filed: Oct. 24, 2006

(65) Prior Publication Data

US 2007/0091467 A1    Apr. 26, 2007

(30) Foreign Application Priority Data

Oct. 25, 2005   (JP)  ............................. 2005-310118

(51) Int. Cl.
  *G02B 9/00*   (2006.01)
  *G02B 13/02*   (2006.01)

(52) U.S. Cl. ...................... 359/754; 359/745

(58) Field of Classification Search ................ 359/566, 359/569, 574, 576, 745–748, 755–757, 763–764, 359/771–772, 784–785, 793, 754
See application file for complete search history.

(56) References Cited

U.S. PATENT DOCUMENTS

| | | |
|---|---|---|
| 5,790,321 A | 8/1998 | Goto |
| 5,796,520 A | 8/1998 | Maruyama |
| 6,268,969 B1 | 7/2001 | Ogawa |
| 6,313,958 B1 | 11/2001 | Ogawa |
| 6,381,079 B1 | 4/2002 | Ogawa |
| 6,496,310 B2 * | 12/2002 | Fujimoto ................ 359/680 |

FOREIGN PATENT DOCUMENTS

| | | |
|---|---|---|
| EP | 0950911 A2 | 10/1999 |
| JP | 06-324262 A | 11/1994 |
| JP | 06-331887 A | 12/1994 |
| JP | 2000-258685 A | 9/2000 |

OTHER PUBLICATIONS

SPIE vol. 1354, International Lens Design Conference (1990).

* cited by examiner

*Primary Examiner*—Scott J. Sugarman
*Assistant Examiner*—Jack Dinh
(74) *Attorney, Agent, or Firm*—Canon U.S.A., Inc., IP Division (57) ABSTRACT

An image-pickup optical system includes, from the object side to the image side, a first lens unit having positive optical power, an aperture stop, and a second lens unit. A diffractive optical element and a lens composed of extraordinary partial dispersion material are appropriately disposed in the optical system. The image-pickup optical system is capable of reducing the generation of flare and ghosts at the diffractive optical element and effectively correcting chromatic aberration.

8 Claims, 7 Drawing Sheets

IMAGE-PICKUP OPTICAL SYSTEM

BACKGROUND OF THE INVENTION

1. Field of the Invention

The present invention relates to an image-pickup optical system, such as for example a shooting or photographing system.

2. Description of the Related Art

A known image-pickup optical system having a long focal length includes, from the object side to the image side, a front lens component having positive refractive power and a rear lens component having negative refractive power. Such an optical system is known as a telephoto type optical system or, simply, a telephoto lens.

In a typical telephoto lens, as the focal length increases, longitudinal chromatic aberration and lateral chromatic aberration worsens in particular among the various types of chromatic aberration. In general, these types of chromatic aberration are corrected by combining a positive lens and a negative lens, where the positive lens is constructed of low-dispersion material, such as fluorite, having extraordinary partial dispersion and the negative lens is constructed of a high-dispersion material.

Extraordinary partial dispersion material efficiently corrects chromatic aberration but is difficult to process. The relative density of extraordinary partial dispersion material is greater than other low-dispersion materials not having an extraordinary partial dispersion characteristic. Thus, by using extraordinary partial dispersion material, the weight of the entire lens system increases.

For example, the relative density of fluorite is 3.18, and a commercial product FK01 known to be an extraordinary partial dispersion material similar to fluorite has a relative density of 3.63. In contrast, a commercial product FK5 that is a material whose extraordinary partial dispersion is small has a relative density of 2.46, and a commercial product BK7 has a relative density of 2.52.

Another known method for correcting chromatic aberration of an optical system is a method using a diffractive optical element (refer to "SPIE" (Vol. 1354, International Lens Design Conference (1990)) and Japanese Patent Laid-Open Nos. 6-324262 (corresponding to U.S. Pat. No. 5,790,321), 6-331887 (corresponding to U.S. Pat. No. 5,796,520), and 2000-258685 (corresponding to U.S. Pat. No. 6,381,079)).

The method uses the physical phenomenon in which chromatic aberration caused by a light beam having a specific wavelength is generated in opposite directions on the refracting surface and the diffracting surface in an optical system.

When a diffractive optical element is used as the lens closest to the object in a first lens unit of a telephoto lens, longitudinal chromatic aberration and lateral chromatic aberration of the optical system is very effectively corrected. However, when very intense light, such as sun light from the sun outside the angle of view, is incident on the diffractive optical element, flare and ghosts are generated. As a result, the entire image may be covered with a whitish haze.

SUMMARY OF THE INVENTION

The present invention provides an image-pickup optical system capable of efficiently correcting chromatic aberration while suppressing, as much as possible, the generation of flare and ghosts at a diffractive optical element.

The image-pickup optical system includes, from the object side to the image side, a first lens unit having positive optical power, an aperture stop, and a second lens unit. A diffractive optical element and a lens composed of extraordinary partial dispersion material are appropriately disposed in the optical system.

Further features of the present invention will become apparent from the following description of exemplary embodiments (with reference to the attached drawings).

DESCRIPTION OF THE EMBODIMENTS

Image-pickup optical systems according to embodiments of the present invention will be described with reference to the accompanying drawings.

Figure 1:
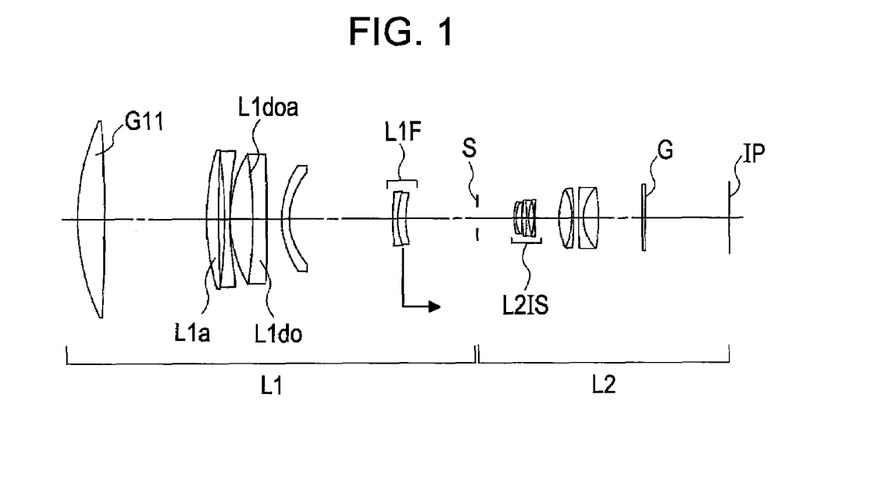
FIG. 1 is a cross-sectional view of lenses included in an image-pickup system according to a first numerical example.
Figure 2:
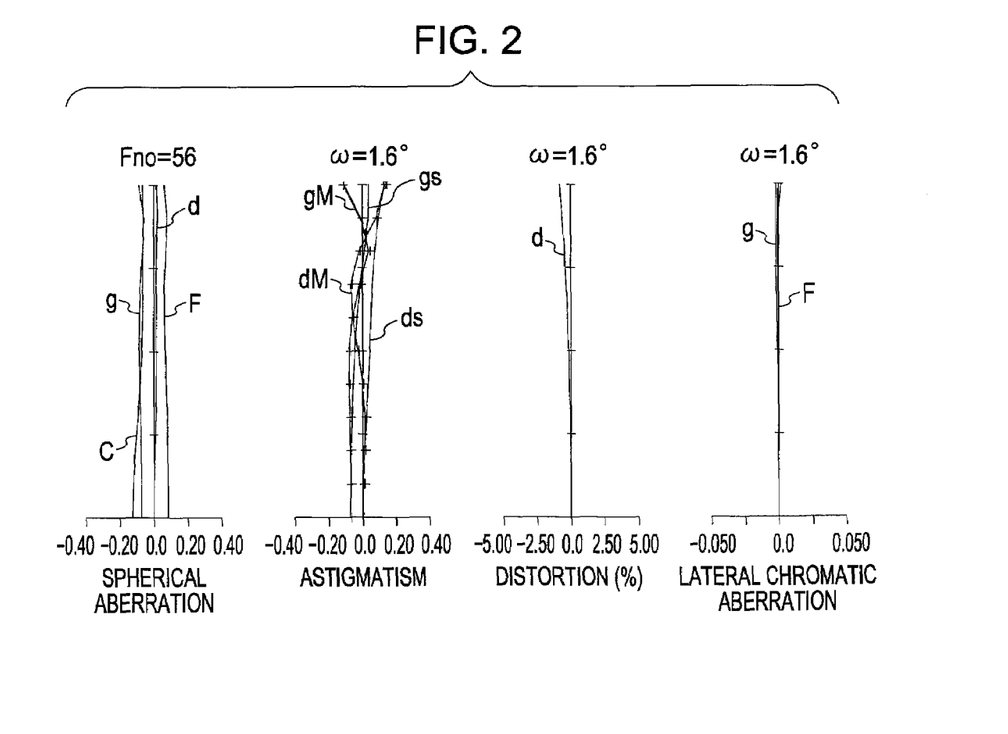
FIG. 2 illustrates the aberration of the image-pickup system according to the first numerical example.

FIG. 1 is a cross-sectional view of lenses included in an image-pickup system according to a first embodiment. FIG. 2 illustrates the aberration of the image-pickup system according to the first embodiment when the system is focused at an object at an infinite distance.

Figure 3:
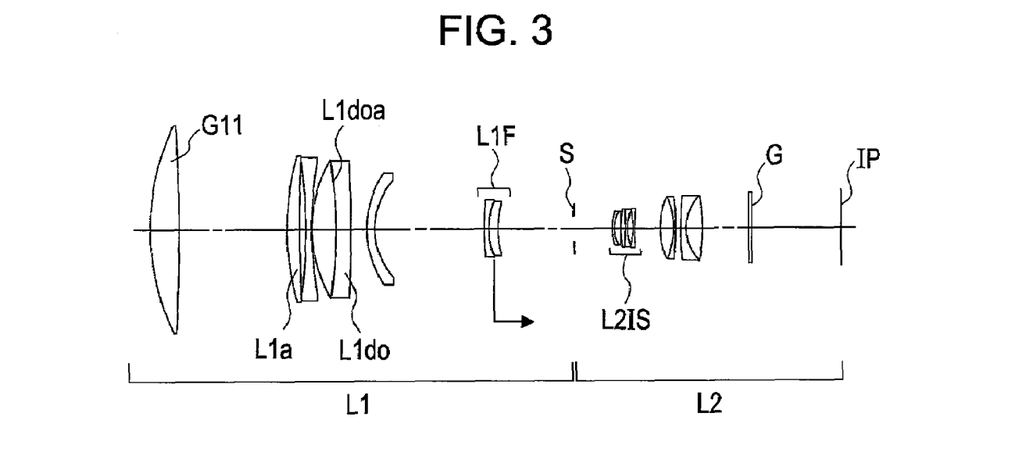
FIG. 3 is a cross-sectional view of lenses included in an image-pickup system according to a second numerical example.
Figure 4:
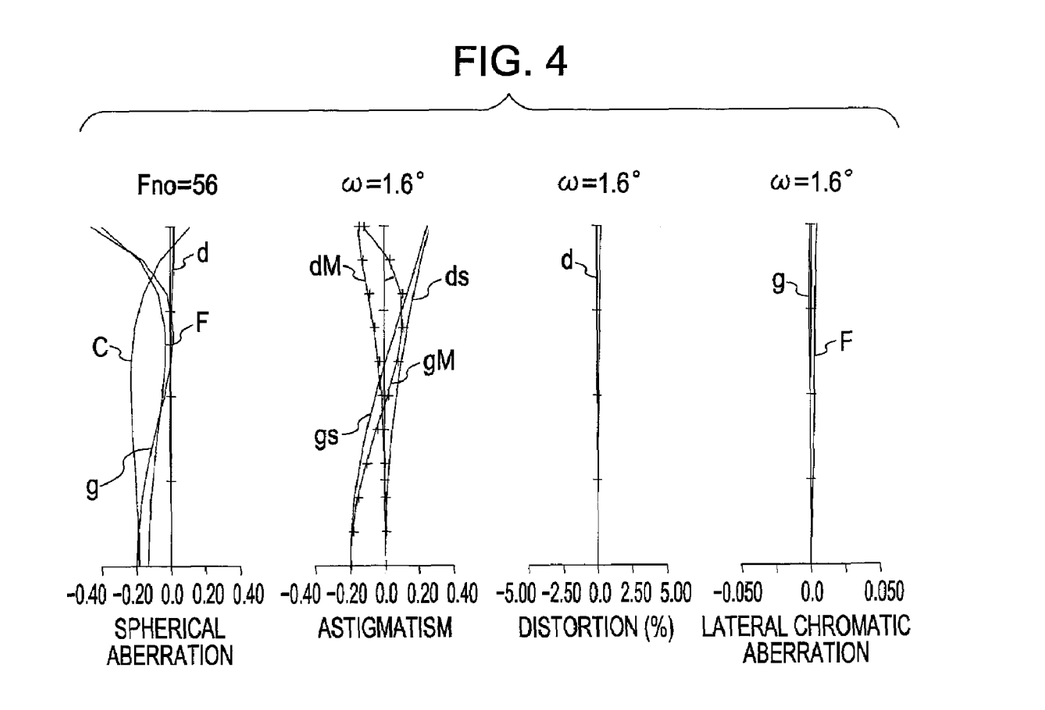
FIG. 4 illustrates the aberration of the image-pickup system according to the second numerical example.

FIG. 3 is a cross-sectional view of lenses included in an image-pickup system according to a second embodiment. FIG. 4 illustrates the aberration of the image-pickup system according to the second embodiment when the system is focused at an object at an infinite distance.

Figure 5:
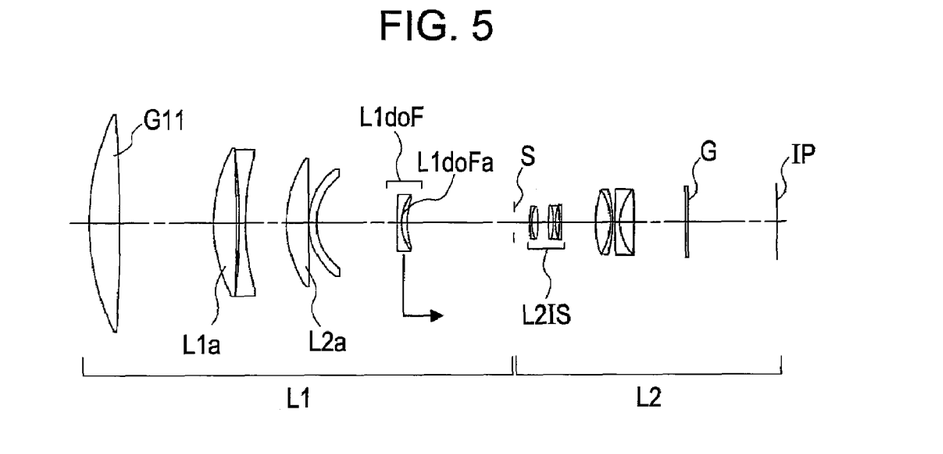
FIG. 5 is a cross-sectional view of lenses included in an image-pickup system according to a third numerical example.
Figure 6:
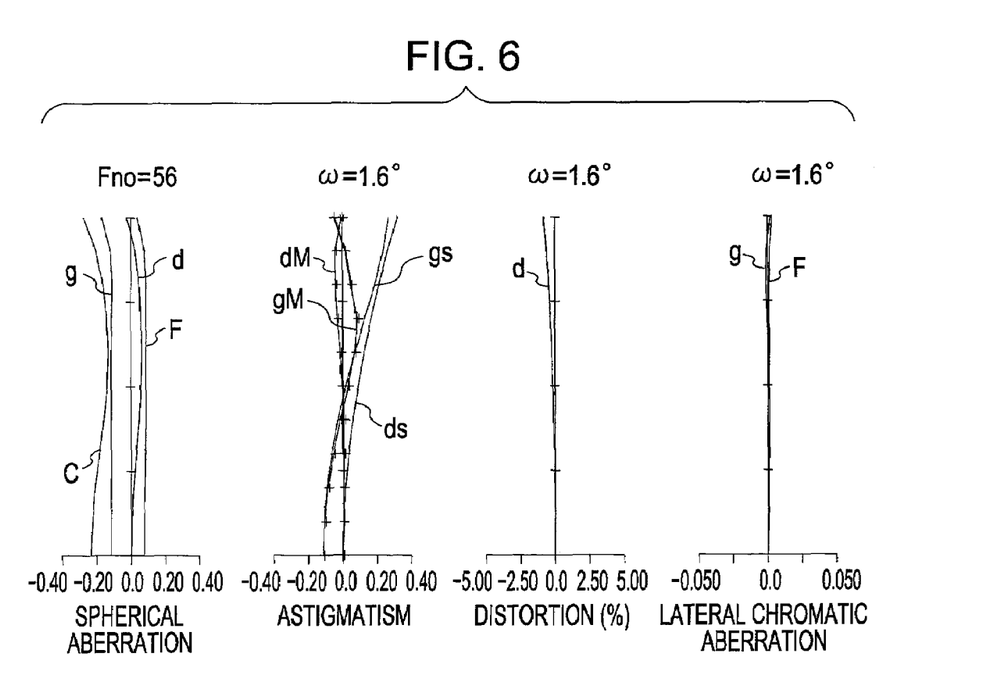
FIG. 6 illustrates the aberration of the image-pickup system according to the third numerical example.

FIG. 5 is a cross-sectional view of lenses included in an image-pickup system according to a third embodiment. FIG. 6 illustrates the aberration of the image-pickup system according to the third embodiment when the system is focused at an object at an infinite distance.

The image-pickup systems illustrated in the cross-sectional views of FIGS. 1, 3, and 5 each include a first lens unit L1 having positive refractive power (optical power=inverse of focal length), a second lens unit L2 having positive or negative refractive power, and an aperture stop S. The aperture stop S is interposed between the first lens unit L1 and the second lens unit L2.

Each image-pickup system also includes a glass block G that is provided on the basis of an optical design to correspond to optical filters and face plates.

An image plane IP is also provided. When the image-pickup optical system according to this embodiment is used in a video camera or a digital still camera, the imaging plane of a solid-state image-pickup element (photoelectric transducer), such as a charge-coupled device (CCD) sensor or a complementary metal-oxide semiconductor (CMOS) sensor is provided at the position of the image plane IP. When the image-pickup optical system according to this embodiment is used in a silver halide film camera, the film surface is provided at the position of the image plane IP.

The Abbe number vd and the partial dispersion ratio θgF are determined by the following expressions:

$$vd=(Nd-1)/(NF-NC) \text{ and}$$

$$\theta gF=(Ng-NF)/(NF-NC)$$

where the indices of refraction of a material for the g line, d line, F line, and C line are Ng, Nd, NF, and NC, respectively.

At this time, the material that satisfies the following conditions is referred to as an extraordinary partial dispersion material:

$$75 < vd \text{ and}$$

$$0.5 < \theta gF < 0.6$$

According to the first embodiment shown in the cross-sectional view of FIG. 1, a compound lens L1do of the first lens unit L1 is the second compound lens when counted from the image side to the object side of the first lens unit L1. A diffractive optical element L1doa is provided on the bonding surface of the compound lens L1do.

A positive lens L1a is the second positive lens when counted from the image side to the object side of the first lens unit L1. In the first embodiment, extraordinary partial dispersion material (here, fluorite) is used for constructing the positive lens L1a.

The focus is moved from an object at an infinite distance to an object at a close distance by moving a lens subunit L1F to the image side. The lens subunit L1F is composed of a compound lens. The lens subunit L1F has negative refractive power and is disposed closest to the image in the first lens unit L1.

An image stabilizing lens subunit L2IS is included in the second lens unit L2. By moving the image stabilizing lens subunit L2IS in such a manner that it has a vector component orthogonal to the optical axis, the imaging position of the image-pickup optical system can be changed.

By moving the image stabilizing lens subunit L2IS in this way, blurriness of an image caused by hand movement is corrected. To move the image stabilizing lens subunit L2IS in such a manner that it has a vector component orthogonal to the optical axis, the image stabilizing lens subunit L2IS may be moved in the direction orthogonal to the optical axis or may be rotated around a point on the optical axis.

In FIG. 2, the d line, g line, C line, and F line of spherical aberration represent the aberration at the lines.

For astigmatism, ds and gs represent the sagittal image planes of the d line and the g line and dM and gM represent the meridional image planes. For lateral chromatic aberration, the g line and F line represent aberration.

According to this embodiment, lateral chromatic aberration is corrected by providing the lens L1a constructed of extraordinary partial dispersion material at a position where the paraxial chief ray $\bar{h}$ is relatively high.

Longitudinal chromatic aberration is corrected by providing the diffractive optical element L1doa at a position where the paraxial marginal ray h is relatively low.

According to the second embodiment shown in the cross-sectional view of FIG. 3, a compound lens L1do of a first lens unit L1 is the second compound lens when counted from the image side to the object side of the first lens unit L1. A diffractive optical element L1doa is provided on the bonding surface of the compound lens L1do.

A positive lens L1a is the second positive lens when counted from the image side to the object side of the first lens unit L1. A positive lens L1a is a positive meniscus lens having a convex surface on the object side and is constructed with extraordinary partial dispersion material (which, in this case, is fluorite).

The focus is moved from an object at an infinite distance to an object at a closer distance by moving the lens subunit L1F to the image side. The lens subunit L1F is composed of a compound lens. The lens subunit L1F has a negative refractive power and is disposed closest to the image in the first lens unit L1.

An image stabilizing lens subunit L2IS is included in a second lens unit L2. By moving the image stabilizing lens subunit L2IS in such a manner that it has a vector component orthogonal to the optical axis, the imaging position of the image-pickup optical system can be changed.

Descriptions of the aberration illustrated in FIG. 4 is the same as that illustrated in FIG. 2.

According to this embodiment, lateral chromatic aberration is corrected by providing the diffractive optical element L1doa at a position where the paraxial chief ray $\bar{h}$ is relatively high.

Longitudinal chromatic aberration is corrected by providing the lens L1a constructed of extraordinary partial dispersion material at a position where the paraxial marginal ray h is relatively low.

According to the third embodiment shown in the cross-sectional view of FIG. 5, a diffractive optical element L1doFa is provided on the bonding surface of a compound lens L1doF of a first lens unit L1. The compound lens L1doF has negative refractive power and is disposed closest to the image in a first lens unit L1.

The focus can be moved from an object at an infinite distance to an object at a close distance by moving the compound lens L1doF towards the image. That is that the compound lens L1doF is the lens subunit for focusing.

According to the third embodiment, among the positive lens included in a first lens unit L1, the second and third positive lenses L1a and L2a when counted from the object side to the image side are constructed of extraordinary partial dispersion material (in this case, fluorite).

An image stabilizing lens subunit L2IS is included in a second lens unit L2. By moving the image stabilizing lens subunit L2IS in such a manner that it has a vector component orthogonal to the optical axis, the imaging position of the image-pickup optical system can be changed.

Descriptions of the aberration illustrated in FIG. 6 is the same as that illustrated in FIGS. 2 and 4.

According to this embodiment, lateral chromatic aberration is corrected by providing the lenses L1a and L2a constructed of extraordinary partial dispersion material at positions where the paraxial chief ray $\bar{h}$ is relatively high.

Longitudinal chromatic aberration is corrected by providing the diffractive optical element L1doFa at a position near the aperture stop S where the paraxial marginal ray h is relatively low.

In each embodiment, a diffractive optical element is provided at a position that is closer to the object than the aperture stop S and that satisfies the following expression:

$$0.1 < \phi do/\phi f < 0.7 \tag{1}$$

where φf represents the effective diameter of a lens (positive lens G11 in each embodiment) disposed closest to the object in the image-pickup optical system and φdo represents the effective diameter of the diffractive optical element.

Furthermore, a lens constructed of extraordinary partial dispersion material, i.e., a material that satisfies the following conditions:

$$0.5 < \theta gF < 0.6 \tag{2}$$

$$75 < \nu d \tag{3}$$

is disposed at a position that satisfies the following condition:

$$0.2 < \phi do/\phi a < 1.5 \tag{4}$$

where φa represents the effective diameter of the lens constructed of extraordinary partial dispersion material.

Expressions 1 to 4 define the positions where the diffractive optical element and the lenses constructed of extraordinary partial dispersion material are to be provided in the optical system.

The expressions 2 and 3 define the partial dispersion ratio θgF of the extraordinary partial dispersion material and the Abbe number νd.

Expression 1 defines the position where the diffractive optical element is to be provided so as to prevent highly intense light, such as sun light from the sun outside the angle of view, from being incident on the diffractive optical element and causing flare.

When the lower limit of Expression 1 is surpassed, less flare is generated by the highly intense direct light outside the angle of view incident on the diffractive optical element. However, it becomes difficult to correct aberration, in particular, chromatic aberration, of the image-pickup optical system.

When the higher limit of Expression 1 is exceeded, chromatic aberration can be effectively corrected. However, it becomes difficult to reduce flare generated by highly intense direct light outside the angle of view being incident on the diffractive optical element.

Expressions 2 and 3 define the range of dispersion of the extraordinary partial dispersion material. If a material with dispersion not included in the range defined by the expressions 2 and 3 is used, it becomes difficult to correct chromatic aberration of the image-pickup optical system.

Expression 4 defines the position where to provide a lens constructed of extraordinary partial dispersion material.

When the lower limit of Expression 4 is surpassed, the diameter of the lens constructed of extraordinary partial dispersion material becomes too great. This is undesirable since the weight of the entire optical system also becomes great.

When the higher limit of Expression 4 is exceeded, it becomes difficult to correct chromatic aberration.

By satisfying the conditions defined by the Expressions above, an image-pickup optical system capable of reducing flare generated by highly intense direct light outside the angle of view being incident on the diffractive optical element and capable of effectively correcting chromatic aberration can be provided.

By setting the numerical range of Expressions 1 to 4 as indicated below, flare can be reduced and chromatic aberration can be corrected even more effectively:

$$0.20 < \phi do/\phi f < 0.68 \tag{1a}$$

$$0.5 < \theta gF < 0.55 \tag{2a}$$

$$85 < \nu d \tag{3a}$$

$$0.30 < do/\phi a < 1.25 \tag{4a}$$

More desirably, the partial dispersion ratio θgF and the Abbe number νd may be set as below:

$$0.52 < \theta gF < 0.54 \tag{2b}$$

$$90 < \nu d \tag{3b}$$

In each embodiment, the image-pickup optical system includes only one diffractive optical element.

However, as in the third embodiment, a plurality of lenses constructed of a material satisfying Expressions 2 and 3 may be provided in the image-pickup optical system.

The image-pickup optical system according to an embodiment satisfies the following condition:

$$0.10 < |fa/f| < 0.80 \tag{5}$$

where fa represents the focal length of the lens constructed of a material satisfying Expressions 2 and 3 and f represents the focal length of the entire system when focused at an object at infinite distance.

Expression 5 defines the refractive power of a lens constructed of extraordinary partial dispersion material. When the lower limit of Expression 5 is surpassed, the refractive power of the lens constructed of extraordinary partial dispersion material becomes too great. This is undesirable because chromatic aberration will be over-corrected.

When the higher limit of Expression 5 is exceeded, the refractive power of the lens constructed of extraordinary partial dispersion material becomes too small, and it becomes difficult to correct chromatic aberration.

In the third embodiment, a plurality of lenses constructed of extraordinary partial dispersion material is provided. Each of these lenses satisfies Expression 5.

It is desirable for correcting chromatic aberration to set the numerical range of Expression 5 as below:

$$0.20 < |fa/f| < 0.65 \tag{5a}$$

The image-pickup optical system according to an embodiment satisfies the following condition:

$$0.10 < |Rdo/Ldo-img| < 1.00 \tag{6}$$

where Rdo represents the radius of curvature of the surface where the diffractive optical element is provided and Ldo-img represents the length from the diffractive optical element to the image plane.

Expression 6 defines the ratio of the radius of curvature of the surface provided with the diffractive optical element with respect to the length from the diffractive optical element to the image plane. When the lower limit of Expression 6 is surpassed, it is undesirable since flare generated by highly intense direct light outside the angle of view being incident on the diffractive optical element is increased.

When the higher limit of Expression 6 is exceeded, the distance between the diffractive optical element and the image plane becomes too small.

As a result, the spot diameter of unwanted diffracted light near the designed order (for example, if the designed order is first order, "near the designed order" refers to the 0 order and second order) becomes too small. This is undesirable since flare caused by the unwanted diffracted light becomes highly visible.

More desirably, Expression 6 may be set as below:

$$0.11 < |Rdo/Ldo-img| < 0.98 \quad (6a)$$

The image-pickup optical system according to an embodiment satisfies the following condition:

$$0.05 < |fnf/f| < 0.2 \quad (7)$$

where fnf represents the focal length of a lens sub unit that is disposed closest to the image in the first lens unit L1 and that has a negative refractive power.

Expression 7 relates to the refractive power of a lens sub unit for focusing included the image-pickup optical system. When the lower limit of Expression 7 is surpassed, the refractive power of the focusing lens becomes too strong. This is undesirable because the difference in chromatic aberration correction becomes great.

When the higher limit of Expression 7 is exceeded, the refractive power of the focusing lens becomes too small. This is undesirable because the amount of movement while focusing is carried out becomes great.

More desirably, Expression 7 may be set as below:

$$0.07 < |fnf/f| < 0.18 \quad (7a)$$

The image-pickup optical system according to an embodiment satisfies the condition below:

$$0.4 \leq TL/f \leq 0.85 \quad (8)$$

where TL represents the entire length of the lens system.

Here, "the entire length of the lens system" is the distance from the first lens surface closest to the object (i.e., the lens surface closest to the object in the image-pickup optical system) to the image plane.

Expression 8 defines a value known as a telephoto ratio. In the image-pickup optical system according to an embodiment, the refractive powers of elements, such as the first and second lens units, and the distance between main points of elements are set to satisfy Expression 8.

When the telephoto ratio becomes smaller than the lower limit of Expression 8, it becomes difficult to correct chromatic aberration by using a diffractive optical element and a lens constructed of extraordinary partial dispersion material.

When the telephoto ratio exceeds the higher limit, the technological advantage of using a diffractive optical element and a lens constructed of extraordinary partial dispersion material becomes small.

When an image-pickup apparatus is constituted of an image-pickup optical system according to an embodiment and a solid-state image-pickup element, the following conditions are satisfied:

$$0.03 < f/fdo < 0.30 \quad (9)$$

$$0.02 \leq himg/f \leq 0.06 \quad (10)$$

where fdo represents the focal length for only a diffractive optical element and 2·himg represents the effective length (effective diagonal length) of the solid-state image-pickup element.

Expression 9 relates to the optical power of the diffractive optical element in the image-pickup optical system.

When the lower limit of Expression 9 is surpassed, the optical power of the diffractive optical element becomes too small. As a result, it is difficult to correct chromatic aberration. When the higher limit of Expression 9 is exceeded, the optical power of the diffractive optical element becomes too great. This is undesirable because the diffraction efficiency is worsened.

Expression 10 relates to a ratio of the image-pickup range of the image-pickup optical system to the focal length. An image-pickup optical system according to an embodiment is suitable for a telephoto lens system having a long focal length within the range represented by Expression 10.

According to an embodiment, it is significantly advantageous to use a diffractive optical element and a lens constructed of extraordinary partial dispersion material that satisfy the above-identified conditions in an image-pickup optical system according to an embodiment that has a focal length satisfying Expression 10.

It is preferable for correcting chromatic aberration if Expression 9 defines the following numerical range:

$$0.05 < f/fdo < 0.25 \quad (9a)$$

As described above in the embodiments, a diffractive optical element and a lens constructed of extraordinary partial dispersion material are suitably provided in an optical system. Accordingly, a small and light weight image-pickup optical system that has excellent optical characteristics and that is capable of reducing flare caused by highly intense direct light, such as sun light from the sun outside the angle of view, being incident on the diffractive optical element and sufficiently correcting chromatic aberration can be provided.

Next, the structure of a diffractive optical element according to an embodiment will be described.

The diffractive optical element has an optical characteristic that is different from that of typical glass. In other words, the diffractive optical element has negative dispersion and extraordinary partial dispersion.

More specifically, the Abbe number νd equals −3.45 and the partial dispersion ratio θgF equals 0.296.

By applying these characteristics to a refractive optical system, chromatic aberration can be effectively corrected.

The diffractive optical element according to an embodiment may have an aspherical effect by changing the pitch of the grating.

Figure 7:
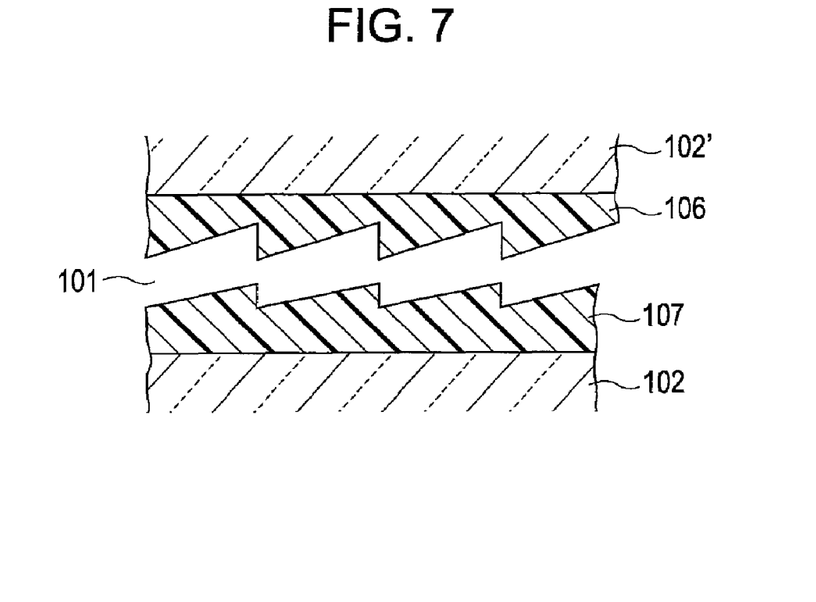
FIG. 7 is a schematic view illustrating an example of a diffractive optical element.
Figure 9:
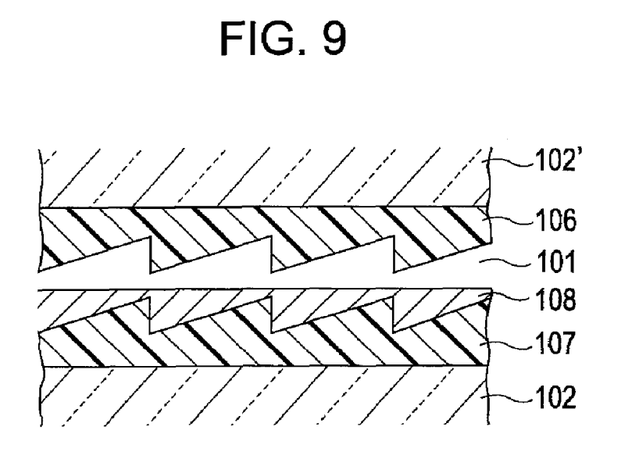
FIG. 9 is a schematic view illustrating another exemplary diffractive optical element.
Figure 11:
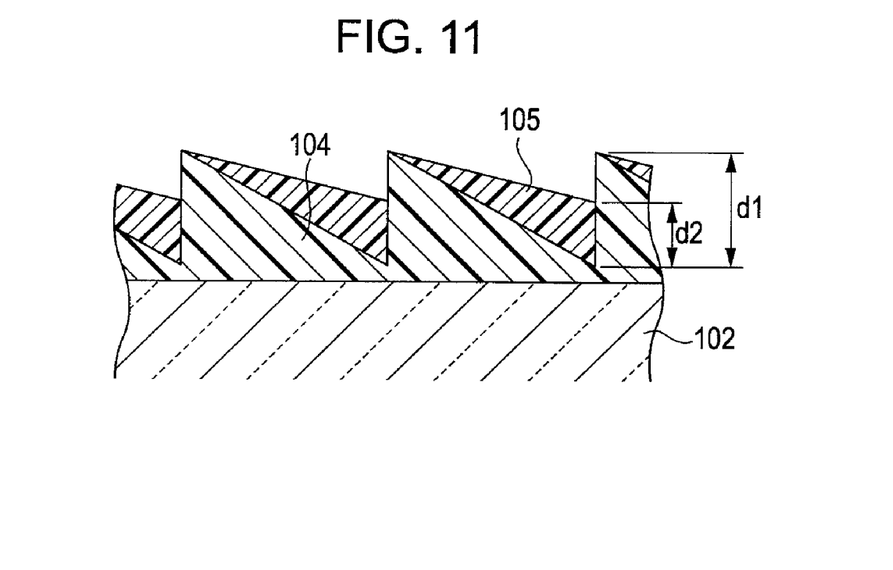
FIG. 11 is a schematic view illustrating another example of a diffractive optical element.

The diffractive optical element may have a two-layer structure in which an air gap 101 is interposed between diffractive gratings 106 and 107, as shown in FIG. 7. Moreover, the diffractive optical element may have a three-layer structure in which an air gap 101 is interposed between diffractive gratings 106 to 108, as shown in FIG. 9. Moreover, the diffractive optical element may have a two-layer structure including diffractive gratings 104 and 105 having different (or the same) grating thickness, as shown in FIG. 11.

A diffractive optical element shown in FIG. 7 is constituted by a first diffractive grating 106 that is constructed of ultraviolet curable resin on a substrate 102' and a second diffractive grating 107 that is constructed of ultraviolet curable resin on a substrate 102.

Figure 8:
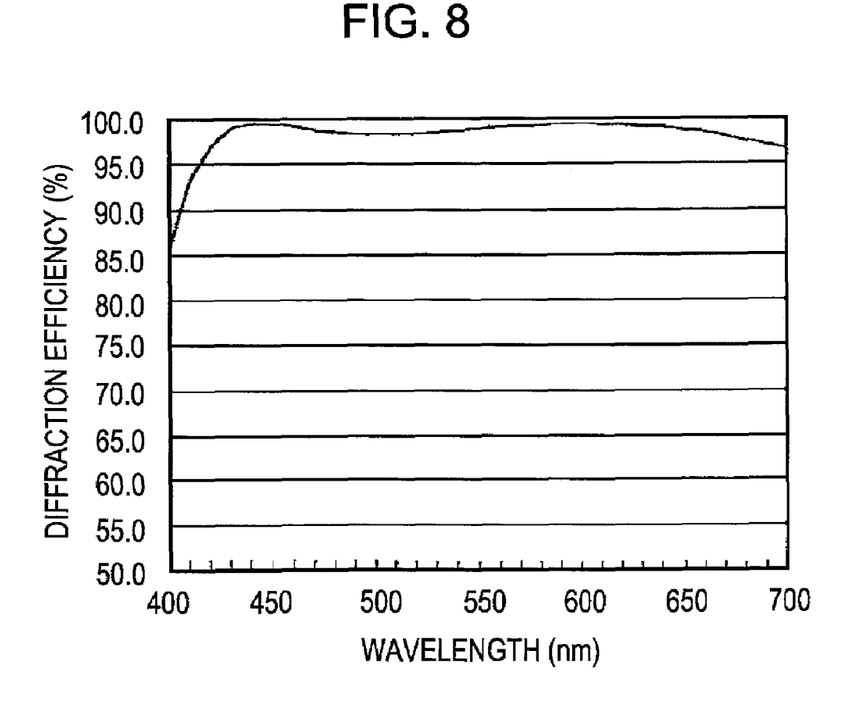
FIG. 8 illustrates the wavelength dependency of the diffractive optical element illustrated in FIG. 7.

FIG. 8 illustrates the wavelength dependency of diffraction efficiency of a first order diffracted light in the diffractive optical element that has a two-layer structure, as illustrated in FIG. 7. As shown in FIG. 8, the diffraction efficiency of the designed order (e.g., first order) represents high one of 95% or more within the entire wavelength range being used.

A diffractive optical element shown in FIG. 9 is constituted of a first diffractive grating 106 that is constructed of ultraviolet curable resin on a substrate 102', a second diffractive grating 107 that is constructed of ultraviolet curable resin on a substrate 102, and a layer 108 constructed by filling the second diffractive grating 107.

Figure 10:
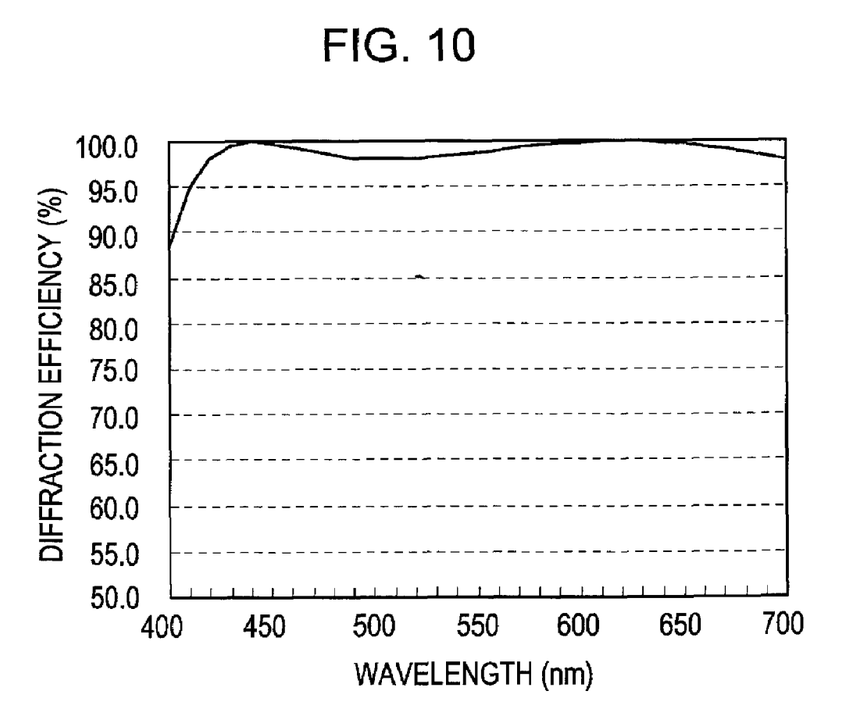
FIG. 10 illustrates the wavelength dependency of the diffractive optical element illustrated in FIG. 9.

FIG. 10 illustrates the wavelength dependency of diffraction efficiency of a first order diffracted light in the diffractive optical element that has a three-layer structure, as illustrated in FIG. 9. As shown in FIG. 10, in 95% or more of the entire wavelength range being used, the diffraction efficiency of the designed order (e.g., first order) is high.

A diffractive optical element shown in FIG. 11 is constituted of a first diffractive grating 104 that is constructed of ultraviolet curable resin on a substrate 102 and a second diffractive grating 105 that is constructed of ultraviolet curable resin on the first diffractive grating 104.

Figure 12:
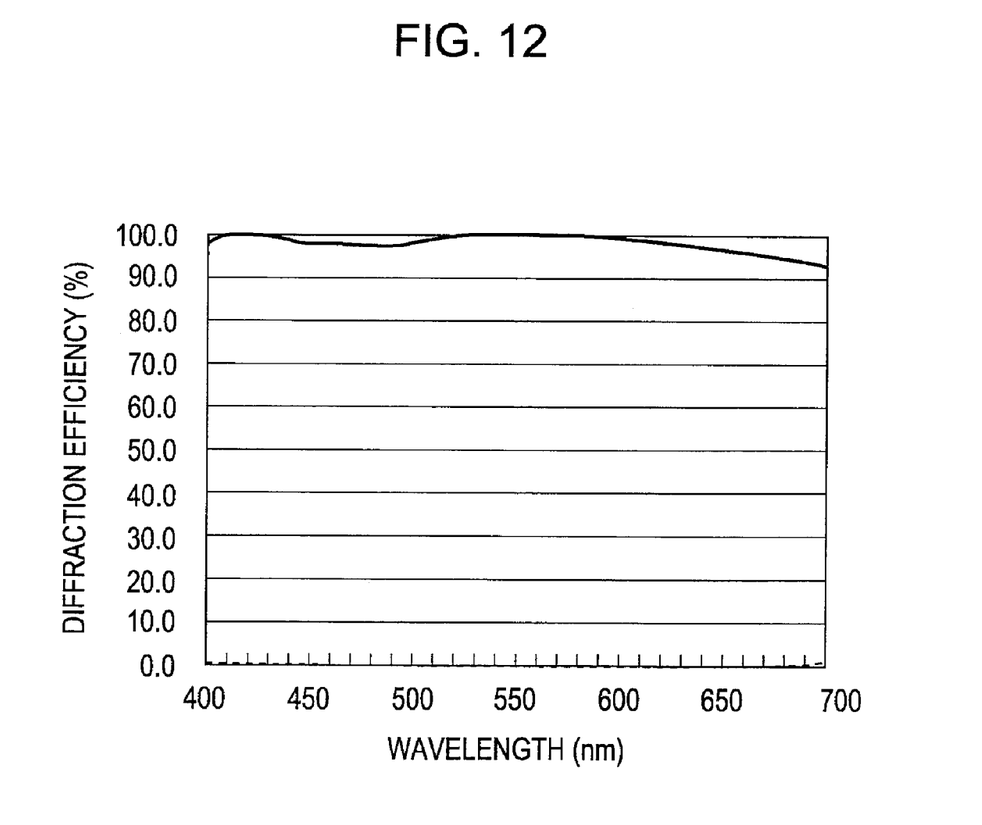
FIG. 12 illustrates the wavelength dependency of the diffractive optical element illustrated in FIG. 11.

FIG. 12 illustrates the wavelength dependency of diffraction efficiency of a first order diffracted light in the diffractive optical element that has a two-layer structure, as illustrated in FIG. 11.

As shown in FIG. 12, in 95% or more of the entire wavelength range being used, the diffraction efficiency of the designed order (first order) is high.

The illustrated diffractive gratings in FIGS. 7, 9, and 11, are enlarged in the height direction so as to show the structure of the diffractive grating in a visually apparent manner. The actual height (depth) of a diffractive grating is on the order of several micrometers to several tens of micrometers, which is negligibly small from a geometric point of view. Therefore, a diffractive optical element having a multiple-layer structure, such as that shown in FIG. 7, 9, or 11, can be presumed to have a geometrically flat structure.

Next, numerical examples will be described.

In each numerical example, ri represents the radius of curvature of the ith plane when counted from the object side; di represents the axial distance between the ith plane and the (i+1)th plane when counted from the object side; ndi represents the index of refraction at the d-line of the material of the ith optical member; and νdi represent the Abbe number at the d-line.

Moreover, f represents the focal length; Fno represents the F number; ω represents the half field angle; AIR represents air; and himg presents a value equal to half the effective image-pickup range.

The phase shape φ of the grating of an diffractive optical element according to an embodiment is represented by the following expression:

$$\phi(h,m) = (2\pi/m\lambda 0) \cdot (C1 \cdot h^2 + C2 \cdot h^4 + C3 \cdot h^6 + \ldots)$$

where m represents the diffraction order of the diffracted light, λ0 represents the designed wavelength, h represents the height in a direction orthogonal to the optical axis, and $C_i$ (i=1, 2, 3 . . . ) is the phase coefficient.

Even when the diffractive optical element is a relief grating, the grating height is negligibly small from a geometric point of view. Therefore, in the numerical examples, the lens surfaces where the diffractive optical elements are provided have the same radius of curvature and the surface spacing is set to zero.

The relationship between the above-described expressions and the various numerical values according to the numerical examples are shown in Table 1.

| | | First Numerical Example | | | | | |
|---|---|---|---|---|---|---|---|
| | | himg/f 0.028 | | Fno 1:56 | | 2ω 3.2° | |
| | | Radius of curvature ri | | Surface spacing di | | Index of refraction nd | Abbe number νd |
| (Diffraction plane→) | r1 | 183.709 | d1 | 19.772 | nd1 | 1.48749 | νd1 70.24 |
| | r2 | −1914.310 | d2 | 76.479 | nd2 | AIR | νd2 AIR |
| | r3 | 117.091 | d3 | 15.496 | nd3 | 1.43387 | νd3 95.1 |
| | r4 | −880.797 | d4 | 5.203 | nd4 | AIR | νd4 AIR |
| | r5 | −370.906 | d5 | 4.000 | nd5 | 1.83481 | νd5 42.71 |
| | r6 | 168.693 | d6 | 4.406 | nd6 | AIR | νd6 AIR |
| | r7 | 86.311 | d7 | 14.614 | nd7 | 1.48749 | νd7 70.24 |
| | r8 | 3790.412 | d8 | 0.426 | nd8 | AIR | νd8 AIR |
| | r9 | 47.560 | d9 | 5.500 | nd9 | 1.48749 | νd9 70.24 |
| | r10 | 42.322 | d10 | 22.977 | nd10 | AIR | νd10 AIR |
| | r11 | 219.209 | d11 | 3.600 | nd11 | 1.88300 | νd11 40.77 |
| | r12 | 51.566 | d12 | 10.000 | nd12 | 1.59270 | νd12 35.31 |
| | r13 | 331.125 | d13 | 53.030 | nd13 | | νd13 |
| | r14 | 214.624 | d14 | 3.200 | nd14 | 1.84666 | νd14 23.78 |
| | r15 | 341.843 | d15 | 6.961 | nd15 | 1.88300 | νd15 40.77 |
| | r16 | 59.457 | d16 | 48.596 | nd16 | | νd16 |
| | r17 | ∞ (aperture stop) | d17 | 12.601 | nd17 | AIR | νd17 AIR |
| | r18 | 49.695 | d18 | 1.300 | nd18 | 1.84666 | νd18 23.78 |
| | r19 | 23.534 | d19 | 5.000 | nd19 | 1.62004 | νd19 36.26 |
| | r20 | −269.332 | d20 | 2.279 | nd20 | AIR | νd20 AIR |
| | r21 | 125.381 | d21 | 5.500 | nd21 | 1.71736 | νd21 29.52 |
| | r22 | −54.221 | d22 | 1.300 | nd22 | 1.75500 | νd22 52.32 |
| | r23 | 35.909 | d23 | 2.720 | nd23 | AIR | νd23 AIR |
| | r24 | −50.755 | d24 | 1.300 | nd24 | 1.77250 | νd24 49.60 |
| | r25 | 311.894 | d25 | 17.033 | nd25 | AIR | νd25 AIR |
| | r26 | 61.596 | d26 | 5.500 | nd26 | 1.88300 | νd26 40.77 |
| | r27 | 45.622 | d27 | 6.869 | nd27 | 1.62004 | νd27 36.26 |
| | r28 | −184.650 | d28 | 2.972 | nd28 | AIR | νd28 AIR |

-continued

First Numerical Example

| | | himg/f<br>0.028<br>Radius of<br>curvature ri | | Fno<br>1:56<br>Surface<br>spacing di | | 2ω<br>3.2°<br>Index of<br>refraction nd | | Abbe number<br>vd |
|---|---|---|---|---|---|---|---|---|
| | r29 | 248.756 | d29 | 3.500 | nd29 | 1.84666 | vd29 | 23.78 |
| | r30 | 37.320 | d30 | 10.692 | nd30 | 1.67270 | vd30 | 32.10 |
| | r31 | −79.415 | d31 | 29.174 | nd31 | AIR | vd31 | AIR |
| | r32 | ∞ | d32 | 2.000 | nd32 | 1.51633 | vd32 | 64.14 |
| | r33 | ∞ | d33 | 60.000 | nd33 | AIR | vd33 | AIR |

C1 −6.00886E−05
C2 −1.33138E−09
C3 −7.51923E−12

Second Numerical Example

| | | himg/f<br>0.028<br>Radius of<br>curvature ri | | Fno<br>1:56<br>Surface<br>spacing di | | 2ω<br>3.2°<br>Index of<br>refraction nd | | Abbe number<br>vd |
|---|---|---|---|---|---|---|---|---|
| (Diffraction | r1 | 166.160 | d1 | 19.499 | nd1 | 1.48749 | vd1 | 70.24 |
| plane→) | r2 | −1163.016 | d2 | 72.229 | nd2 | AIR | vd2 | AIR |
| | r3 | 177.935 | d3 | 8.274 | nd3 | 1.48749 | vd3 | 70.24 |
| | r4 | 988.698 | d4 | 4.361 | nd4 | AIR | vd4 | AIR |
| | r5 | −358.277 | d5 | 4.000 | nd5 | 1.83481 | vd5 | 42.71 |
| | r6 | 256.779 | d6 | 0.150 | nd6 | AIR | vd6 | AIR |
| | r7 | 94.821 | d7 | 16.037 | nd7 | 1.48749 | vd7 | 70.24 |
| | r8 | −324.716 | d8 | 10.000 | nd8 | 1.88300 | vd8 | 40.77 |
| | r9 | −1293.341 | d9 | 10.793 | nd9 | AIR | vd9 | AIR |
| | r10 | 68.212 | d10 | 5.300 | nd10 | 1.43387 | vd10 | 95.10 |
| | r11 | 50.302 | d11 | 73.745 | nd11 | AIR | vd11 | AIR |
| | r12 | 318.221 | d12 | 3.200 | nd12 | 1.83400 | vd12 | 37.16 |
| | r13 | 55.715 | d13 | 6.047 | nd13 | 1.84666 | vd13 | 23.78 |
| | r14 | 73.930 | d14 | 50.366 | nd14 | | vd14 | |
| | r15 | ∞ (aperture stop) | d15 | 26.733 | nd15 | AIR | vd15 | AIR |
| | r16 | 47.616 | d16 | 1.300 | nd16 | 1.84666 | vd16 | 23.78 |
| | r17 | 24.996 | d17 | 4.198 | nd17 | 1.57501 | vd17 | 41.51 |
| | r18 | −295.809 | d18 | 0.150 | nd18 | AIR | vd18 | AIR |
| | r19 | 80.950 | d19 | 3.231 | nd19 | 1.72151 | vd19 | 29.23 |
| | r20 | −123.356 | d20 | 1.300 | nd20 | 1.72916 | vd20 | 54.68 |
| | r21 | 33.183 | d21 | 3.500 | nd21 | AIR | vd21 | AIR |
| | r22 | −54.791 | d22 | 1.300 | nd22 | 1.72916 | vd22 | 54.68 |
| | r23 | 167.423 | d23 | 17.016 | nd23 | AIR | vd23 | AIR |
| | r24 | 57.530 | d24 | 9.151 | nd24 | 1.61293 | vd24 | 37.01 |
| | r25 | −47.174 | d25 | 1.400 | nd25 | 1.69680 | vd25 | 55.53 |
| | r26 | −143.031 | d26 | 3.311 | nd26 | AIR | vd26 | AIR |
| | r27 | 375.410 | d27 | 3.500 | nd27 | 1.84666 | vd27 | 23.78 |
| | r28 | 32.317 | d28 | 10.791 | nd28 | 1.69895 | vd28 | 301279.00 |
| | r29 | −123.212 | d29 | 31.120 | nd29 | AIR | vd29 | AIR |
| | r30 | ∞ | d30 | 2.000 | nd30 | 1.51633 | vd30 | 64.14 |
| | r31 | ∞ | d31 | 60.000 | nd31 | AIR | vd31 | AIR |

C1 −4.82889E−05
C2 2.90800E−09
C3 −1.47575E−13

Third Numerical Example

| | | himg/f<br>0.028<br>Radius of<br>curvature ri | | Fno<br>1:56<br>Surface<br>spacing di | | 2ω<br>3.2°<br>Index of<br>refraction nd | | Abbe number<br>vd |
|---|---|---|---|---|---|---|---|---|
| (Diffraction | r1 | 171.976 | d1 | 20.678 | nd1 | 1.48749 | vd1 | 70.24 |
| plane→) | r2 | −1104.531 | d2 | 63.678 | nd2 | AIR | vd2 | AIR |
| | r3 | 109.519 | d3 | 15.390 | nd3 | 1.43387 | vd3 | 95.10 |
| | r4 | −1124.991 | d4 | 1.896 | nd4 | AIR | vd4 | AIR |
| | r5 | −429.096 | d5 | 4.000 | nd5 | 1.83481 | vd5 | 42.71 |

-continued

Third Numerical Example himg/f 0.028
Fno 1:56
2ω 3.2°

| | Radius of curvature ri | | Surface spacing di | | Index of refraction nd | | Abbe number vd |
|---|---|---|---|---|---|---|---|
| r6 | 171.176 | d6 | 27.688 | nd6 | AIR | vd6 | AIR |
| r7 | 79.413 | d7 | 14.795 | nd7 | 1.43387 | vd7 | 95.10 |
| r8 | 10421.755 | d8 | 0.190 | nd8 | AIR | vd8 | AIR |
| r9 | 46.398 | d9 | 5.300 | nd9 | 1.69680 | vd9 | 55.53 |
| r10 | 39.479 | d10 | 54.311 | nd10 | AIR | vd10 | AIR |
| r11 | 286.973 | d11 | 3.200 | nd11 | 1.88300 | vd11 | 40.77 |
| r12 | 32.697 | d12 | 3.675 | nd12 | 1.84666 | vd12 | 23.78 |
| r13 | 51.152 | d13 | 72.076 | nd13 | | vd13 | |
| r14 | ∞ (aperture stop) | d14 | 10.718 | nd14 | AIR | vd14 | AIR |
| r15 | 74.735 | d15 | 1.300 | nd15 | 1.84666 | vd15 | 23.78 |
| r16 | 28.786 | d16 | 4.042 | nd16 | 1.62004 | vd16 | 36.26 |
| r17 | −100.204 | d17 | 7.089 | nd17 | AIR | vd17 | AIR |
| r18 | 102.007 | d18 | 3.616 | nd18 | 1.72825 | vd18 | 28.46 |
| r19 | −43.002 | d19 | 1.300 | nd19 | 1.75500 | vd19 | 52.32 |
| r20 | 35.333 | d20 | 2.635 | nd20 | AIR | vd20 | AIR |
| r21 | −61.433 | d21 | 1.300 | nd21 | 1.88300 | vd21 | 40.77 |
| r22 | 432.550 | d22 | 22.958 | nd22 | AIR | vd22 | AIR |
| r23 | 72.136 | d23 | 10.000 | nd23 | 1.69895 | vd23 | 30.13 |
| r24 | −40.769 | d24 | 1.400 | nd24 | 1.84666 | vd24 | 23.78 |
| r25 | −81.046 | d25 | 1.439 | nd25 | AIR | vd25 | AIR |
| r26 | 307.130 | d26 | 3.500 | nd26 | 1.84666 | vd26 | 23.78 |
| r27 | 32.147 | d27 | 9.897 | nd27 | 1.69895 | vd27 | 30.13 |
| r28 | −369.342 | d28 | 33.927 | nd28 | AIR | vd28 | AIR |
| r29 | ∞ | d29 | 2.000 | nd29 | 1.51633 | vd29 | 64.14 |
| r30 | ∞ | d30 | 60.000 | nd30 | AIR | vd30 | AIR |

C1 −1.56689E−04
C2 −4.11408E−09
C3 −1.94261E−10

TABLE 1

| Conditional expression | First Numerical Example | Second Numerical Example | Third Numerical Example |
|---|---|---|---|
| (1) | 0.389 | 0.652 | 0.233 |
| (2) | 0.537 | 0.537 | 0.537 |
| | | | 0.537 |
| (3) | 95.15 | 95.15 | 95.15 |
| | | | 95.15 |
| (4) | 0.574 | 1.231 | 0.341 |
| | | | 0.400 |
| (5) | 0.494 | 0.619 | 0.462 |
| | | | 0.235 |
| (6) | 0.177 | 0.957 | 0.129 |
| (7) | 0.090 | 0.151 | 0.122 |
| (8) | 0.58 | 0.58 | 0.58 |
| (9) | 0.094 | 0.076 | 0.246 |
| (10) | 0.028 | 0.028 | 0.028 |

A camera (image-pickup apparatus) including an image-pickup optical system according to an embodiment of the present invention will be described with reference to FIG. 13.

Figure 13:
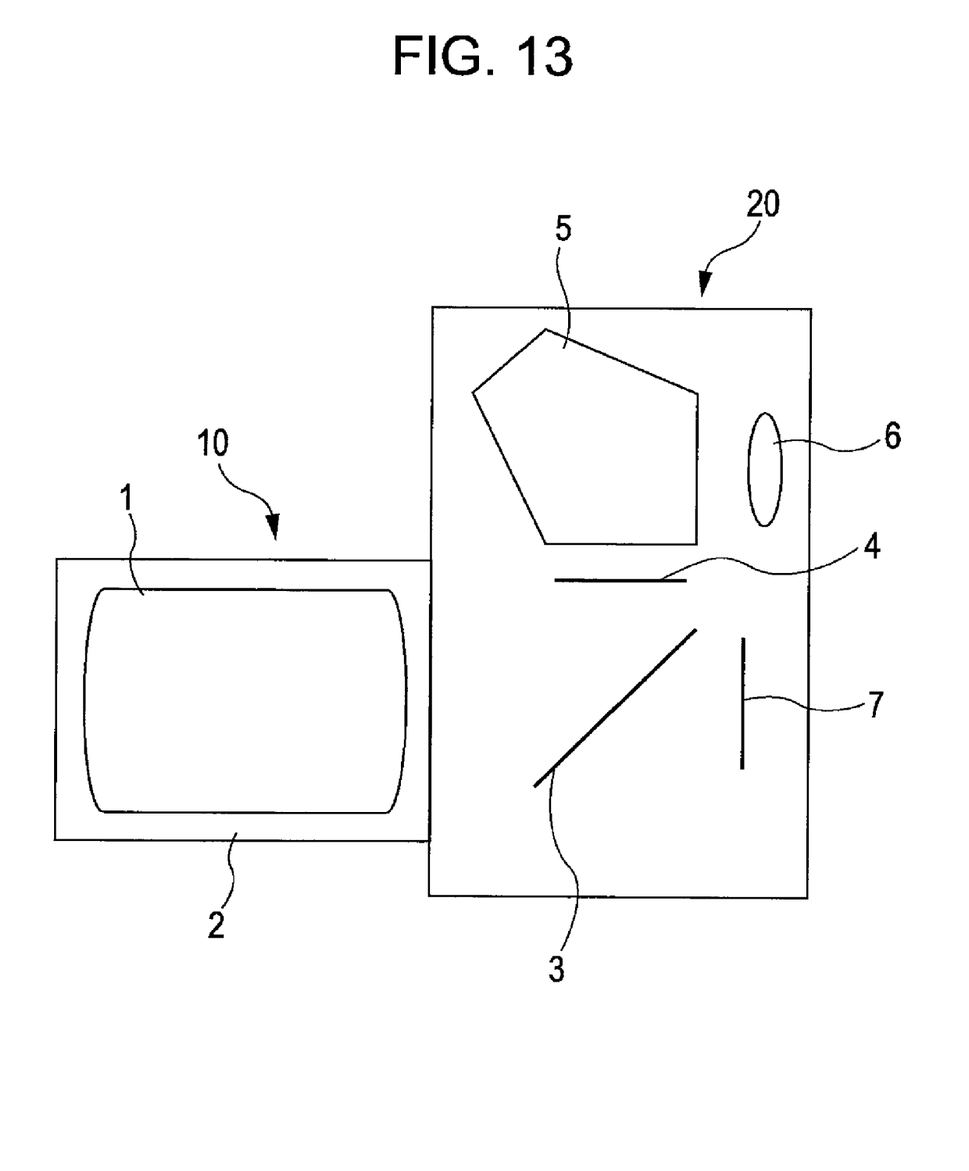
FIG. 13 is a schematic view of the main components of an image-pickup apparatus.

FIG. 13 is a schematic view of the main components of a single-lens reflex camera. FIG. 13 illustrates an image-pickup lens 10 including an image-pickup optical system 1 according to an embodiment. The image-pickup optical system 1 is held by a lens barrel 2, which is a holding member. A camera main body 20 includes a quick-return mirror 3, a focusing screen 4, a penta-roof prism 5, and an ocular lens 6. The quick-return mirror 3 reflects the light beam from the image-pickup lens 10 upward. The focusing screen 4 is disposed at the image formation position of the image-pickup lens 10. The penta-dach prism 5 converts an inverse image formed on the focusing screen 4 into an upright image. The ocular lens 6 is used by an observer to observe the upright image.

On a light-sensitive surface 7 is disposed a solid-state image-pickup element (photoelectric transducer), such as a charge-coupled device (CCD) or a complementary metal-oxide semiconductor (CMOS), or a silver halide film. When capturing an image, the quick-return mirror 3 is retracted from the optical path, and an image is formed by the image-pickup lens 10 on the light-sensitive surface 7.

The image-pickup optical system according to an embodiment is suitable for such an image-pickup apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-310118 filed Oct. 25, 2005, which is hereby incorporated by reference herein in its entirety.

What is claimed is:

1. An image-pickup optical system comprising:
a first lens unit having positive optical power;
an aperture stop; and
a second lens unit;
wherein the first lens unit, the aperture stop, and the second lens unit are disposed this in order from the object side to the image side of the image-pickup optical system, wherein the image-pickup optical system includes a diffractive optical element which is disposed closer to the object than the aperture stop and is disposed at a position satisfying, $$0.1 < \phi do/\phi f < 0.7,$$

where φf represents the beam effective diameter of the lens disposed closest to the object in the image-pickup optical system and φdo represents the beam effective diameter of the diffractive optical element, wherein the image-pickup optical system includes a lens which is provided, the lens being composed of a material satisfying, $$0.5 < \theta gF < 0.6 \text{ and}$$

$$75 < \nu d,$$

where νd represents the Abbe number and θgF represents a partial dispersion ratio, and wherein the lens is disposed at a position satisfying, $$0.2 < \phi do/\phi a < 1.5,$$

where φa represents the beam effective diameter of the lens.

2. The image-pickup optical system according to claim 1, wherein only one diffractive optical element is provided.

3. The image-pickup optical system according to claim 1, wherein $0.10 < |fa/f| < 0.80$ is satisfied, where fa represents the focal length of the lens and f represents the focal length of the entire image-pickup optical system.

4. The image-pickup optical system according to claim 1, wherein $0.10 < |Rdo/Ldo-img| < 1.00$ is satisfied, where Rdo represents the radius of curvature of the plane provided with the diffractive optical element and Ldo–img represents the distance from the diffractive optical element to the image plane.

5. The image-pickup optical system according to claim 1, wherein the first lens unit comprises a lens sub-unit having negative optical power which is provided at a position closest to the image in the first lens unit, the lens sub-unit moving during focusing, and
wherein $0.05 < |fnf/f| < 0.2$ is satisfied, where fnf represents the focal length of the lens sub-unit and f represents the focal length of the entire image-pickup optical system.

6. The image-pickup optical system according to claim 1, wherein $0.4 \leq TL/f \leq 0.85$ is satisfied, where TL represents the entire length of the image-pickup optical system and f represents the focal length of the entire image-pickup optical system.

7. A camera comprising:
an image-pickup optical system according to claim 1; and
a solid-state image-pickup element configured to receive an image formed by the image-pickup optical system.

8. The camera according to claim 7, wherein $0.03 < f/fdo < 0.30$ and $0.02 \leq himg/f \leq 0.06$ are satisfied, where fdo represents the focal length of the diffractive optical element, f represents the focal length of the entire image-pickup optical system, and 2·himg equals the effective diagonal length of the solid-state image-pickup element.

* * * * *